March 21, 1961  L. C. SMITH  2,975,588
THERMAL MONOFUEL REACTOR
Filed Dec. 27, 1954

Loren C. Smith
*INVENTOR.*

BY *M.B. Lilly and R.W. Kelly*
Attorneys

United States Patent Office 2,975,588
Patented Mar. 21, 1961

2,975,588
THERMAL MONOFUEL REACTOR

Loren C. Smith, Livonia, Mich., assignor to Wyandotte Chemicals Corporation, Wyandotte, Mich., a corporation of Michigan Filed Dec. 27, 1954, Ser. No. 477,890
10 Claims. (Cl. 60—35.6)

This invention relates to a thermal monofuel reactor and to a process for thermally reacting a monofuel.

One of the major problems confronting designers of large monofuel reactors, which are employed as jet motors, gas generators, etc., is a satisfactory means of initiating the reaction. Added oxidizers may be utilized, but this requires a second fuel source with complex metering devices. It is conventional to employ a glow plug, or even a spark plug, positioned in line with the injected fuel to heat some of the monofuel above its point of autodecomposition and thus initiate the reaction. The electrical power input required for instantaneously initiating reaction in a monofuel reactor employing, for example, ethylene oxide as a fuel at the rate of one pound per minute is calculated to be about 5000 watts. Highly specialized auxiliary equipment must be maintained to provide an electrical source having an output of this wattage.

An object of this invention is to provide a thermal monofuel reactor which may be operated independently as a relatively low flowrate reactor or utilized in a higher flowrate multistage reactor as the primary chamber, effecting ignition and bringing about the improvements in operating characteristics inherent in such a design.

Another object of this invention is to provide a process for thermally reacting a monofuel which results in a minimum of carbon formation.

Still another object of this invention is to provide a process for thermally reacting a monofuel which permits operation at low reactor body temperatures, thus making possible the use of lightweight, relatively low-melting construction materials.

A further object of this invention is to provide a monofuel reactor wherein reaction is initiated without direct contact between the fuel and an initiator element, and which is capable of continuous reaction without failures due to carbon formation.

A still further object of this invention is to provide a thermal monofuel reactor so constructed as to permit the use of lightweight metals throughout and simultaneously avoid operation failures due to carbon formation.

Figure 1:
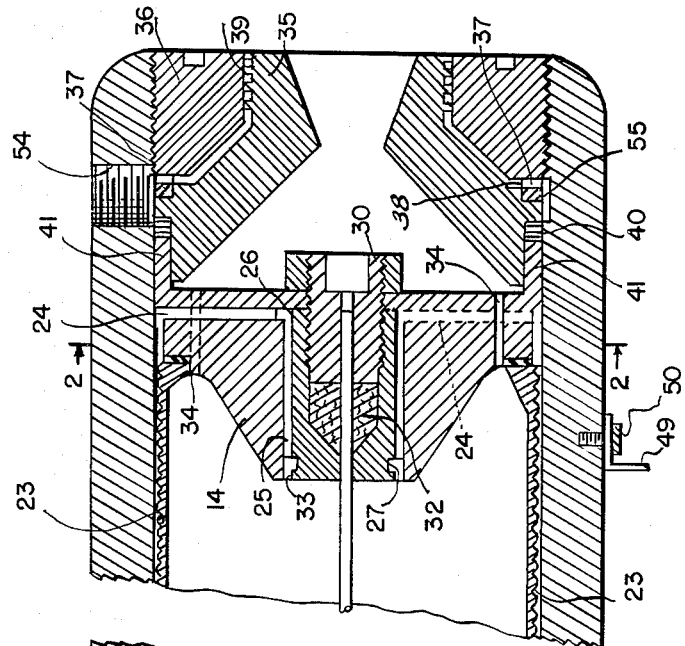
Figure 2:
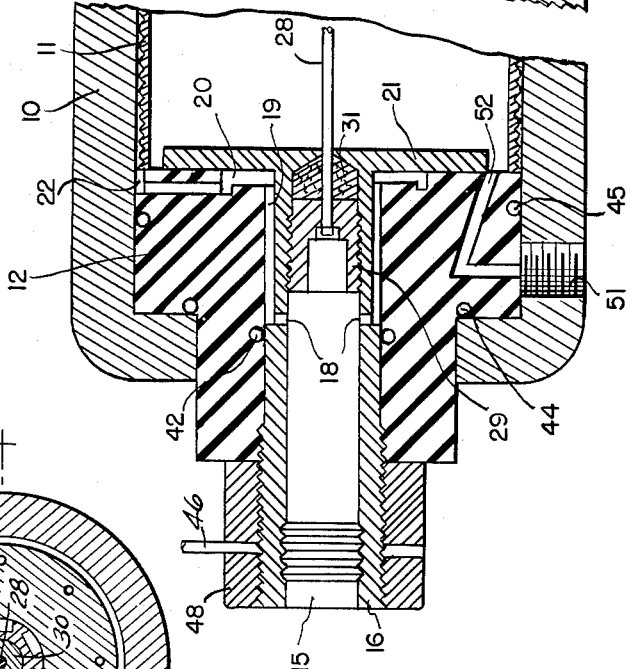

Other objects and advantages of the present invention will become apparent from the following detailed description thereof when read in conjunction with the accompanying drawings, in which:

Fig. 1 is a longitudinal, cross-sectional view of a reactor comprising the present invention, and Fig. 2 is a horizontal cross sectional view taken as along the line 2—2 of the reactor of Fig. 1 and indicating by line 1—1 the Fig. 1 view of the reactor.

In the field of thermal monofuel reactors, it has been discovered that a low flowrate, primary reactor can be made in accordance with the present invention which will provide reliable operation in a lightweight unit. This unit can be used to drive turbines, initiate reaction in a higher flowrate, monofuel reactor when employed as one member in a multistage motor. It has utility as a jet motor and many other uses requiring rapid production of hot gases.

A major problem in constructing low flowrate, monofuel reactors has been unreliable operation arising from carbon formation in the reactor. Higher flowrate reactors apparently blow out most of the carbon through the exhaust ports, but in the lower flowrate reactors carbon tends to build up on the walls, the initiator or heating element and even in the exhaust nozzle. The present invention eliminates, or at least greatly reduces, carbon formation by two means:

(1) Heat transfer to effect autodecomposition without contact between the fuel and the initiator element.

(2) Regenerative cooling of the internal walls of the reactor to a point not substantially above the autodecomposition temperature of the fuel.

Both of these means are in direct contrast to present practices, wherein the monofuel directly contacts the initiator element and the walls are maintained at high temperatures to aid in autodecomposition of the fuel, even where regenerative cooling is employed.

One embodiment of the present invention is disclosed in the accompanying drawings wherein a reactor body 10 is fitted with a sleeve 11. The reactor body is preferably composed of aluminum, aluminum alloys, or some other lightweight material, although other materials may of course be employed. The sleeve 11 must be resistant to corrosion of the hot combustion gases and may be made of nickel-steel alloys such as Inconel. Sleeve 11 is held in place in the reactor body 10 between a head block 12 and a core 14. A fuel line (not shown) is connected to the fuel inlet port 15 which is in turn formed in a metal insert 16. Apertures 18—18 conduct fuel from the inlet port 15 through an annular channel 19 between the insert 16 and the head block 12 to an annular pocket 20 located between a facing 21, formed on one end of the insert 16, and one end of the head block 12. It will be noted that the head block 12 is made of an insulating material, such as Micarta, for reasons hereinafter set forth.

From the annular pocket 20 the fuel is led through a plurality of separate lines 22—22 to spiral grooves 23—23 formed about the exterior of the sleeve 11. The fuel is conducted through these grooves 23—23 to conduits 24—24, which in turn deliver the fuel to another series of longitudinal grooves 25—25 formed in an injector insert 26. The fuel from the grooves 25—25 uniformly fills the annular chamber 27 and issues in a uniform spray through the annular opening 33 formed between the end of the core 14 and the injector insert 26. A resistor rod 28, preferably made of some material such as tungsten, is positioned axially of the fuel spray, and is held in position by packing nuts 29 and 30 located at either end of the rod in the head block 12 and 14, respectively. Graphite packings 31 and 32 prevent leakage of fuel and combustion gases around the packing nuts, and constitute high capacity sliding electrical contacts to maintain current through the heater as it expands during heating. Exhaust ports 34—34 (see particularly Fig. 2) are located in the core 14 and provide an outlet for the combustion gases formed in the reaction chamber. In the particular embodiment of the invention disclosed in the accompanying drawings, an exhaust nozzle 35 is provided which is held in place by a nut 36. The nut 36 is spaced from the exhaust nozzle 35 by means of an annular shoulder 38. A plurality of apertures 37—37 are drilled through the shoulder to permit a cooling fluid to pass between the packing nut and the exterior of the exhaust nozzle, and through spiral grooves 39—39. A conducting packing 40 bears against an annular shoulder 41 of the core 14 and functions both to prevent leakage of fuel as well as providing adequate electrical contact between the grounded side of the resistor and the power source. At the other end of the reactor, a silicone rubber O ring 42 bearing against insert 16 prevents fuel leakage, and silicone rubber O rings 44 and 45 are safeguards against leakage of combustion gases and fuel from the interior of the reactor.

A lead wire 46 is connected at one end with a suitable power source and is attached at the other end to the metal insert 16 by means of a nut 48. The ground side of the circuit is supplied by means of a lead wire 49 attached to the reactor body 10 by a terminal 50.

In operating the reactor above described, fuel is supplied to the inlet port 15 and passes through apertures 18—18, annular channel 19, annular pocket 20, and lines 22—22 to the spiral grooves 23—23. From these grooves the fuel passes through conduits 24—24 and grooves 25—25 and out through the annular injector 33. Simultaneously with the feeding of the fuel, power is supplied to the resistor rod 28, which is completely insulated at one end by the Micarta head block 12 and grounded at the other end through the core 14. The resistor rod 28 immediately heats up and expands longitudinally in the packing nuts 29 and 30 in the drilled openings provided therein. Ignition of the fuel occurs in a matter of seconds. The injector is so designed that the fuel never contacts the resistor rod 28 and consequently carbon formation on the rod is avoided. Some of the heat supplied by the resistor rod 28 radiates outwardly to and through the annular spray of fuel which absorbs some of the radiated heat, and that radiated heat which is not absorbed by the fuel itself passes onwardly to and through the thin sleeve 11 and will be absorbed by the other surfaces in the reaction chamber. The remainder of the heat generated by the resistor element (intended to be a large fraction of the total heat) must either leave the resistor by conduction to the reactor itself or it must pass by convection processes into the injected fuel stream surrounding the resistor. It is this latter fraction of heat dissipated by convection which cannot fail to ignite the fuel if it is injected as described at a flowrate consistent with the power input. The temperature of the sleeve wall rises rapidly, under action of the hot decomposition gases, so that the normal operating temperature is quickly attained and is sufficiently high to effect a self-sustained decomposition in the reactor.

As the reaction continues, the resistor rod 28 is de-energized, since autodecomposition of the fuel is a self-sustaining reaction. The use of a thin sleeve wall permits highly efficient heat exchange between the hot gases in the reaction chamber produced by autodecomposition and the fuel in the grooves 23—23. Consequently, the wall temperature is quickly stabilized at a temperature not substantially above the temperature of autodecomposition of the fuel being employed. This latter point is critical inasmuch as it has been found by actual experimentation that, although carbon will form on the walls at high temperatures, it will not form at temperatures which are not substantially above the autodecomposition point of the fuel being employed.

In addition to exposing the maximum surface of fuel to the heat radiated from the resistor element 28, the annular spray of fuel also provides maximum circulation throughout the reaction chamber, inasmuch as it is directed away from the exhaust ports 34—34. Operation of the reactor is considerably improved by spacing the point of fuel injection inwardly from the exhaust ports 34—34. This eliminates any tendency of unburned fuel to pass from the injector directly into the exhaust ports 34—34 due to the reduced pressure created by the high velocity at the exhaust ports of the products of autodecomposition.

A pressure tap 51 is connected through passageway 52 in the head block 12 with the interior of the reactor and may be connected to any suitable pressure-sensitive device (not shown) for measuring or control purposes depending upon the particular application.

Since some carbon formation has also been noted upon the exhaust nozzle itself, a coolant such as water or air is supplied through a tap 54 to an annular cavity 55 and from there through the holes 37—37 into the spiral grooves 39—39, to keep the walls of the exhaust nozzle 35 below the autodecomposition temperature of the fuel being employed. Where the reactor forms the primary stage in a multistage reactor, reactor parts downstream from the injector core may be cooled by incoming fuel to the subsequent stages entailing some fuel preheating for those stages as in the primary chamber.

There are many advantages apparent from the reactor hereinabove described. Foremost, of course, is the substantial elimination of carbon formation by injecting the fuel axially about the resistor element while at the same time regeneratively cooling the walls of the reactor to keep them at a temperature not substantially above the autodecomposition temperature of the fuel. The same factors also result in a reactor which operates at quite low temperatures so that lightweight, low-melting metals and alloys may be employed, a factor which cannot be overemphasized when designing motors and the like for the aircraft industry. The relatively small size of the resistor element results in fast heatup and almost an instantaneous start. A variation of the reactor shown, which would be immediately apparent to those skilled in the art, permits the use of the fuel line itself as one lead from the electrical power source. All of these advantages of instantaneous starting, carbon-free operation and a lightweight reactor combine to produce a greatly improved monofuel reactor.

A large number of variations in the particular embodiment of the invention shown in the accompanying drawings will be apparent to those skilled in the art. For example, the body 10 may be made of light metals other than aluminum, and may also be made of steel, nickel-steel alloys, etc. The sleeve 11 should be made of a relatively corrosion-resistant metal, although some lightweight alloys of aluminum and other light metals could be employed. The shape and proportions of the reactor may be varied widely. In the embodiment shown in the drawings a multiplicity of spiral grooves are formed about the exterior of the sleeve 11. The number of these grooves and their shape are not material as long as the throughput of the fuel is properly related to the heat absorption by the fuel as it passes through these passageways. Longitudinal grooves could also be employed in place of spiral grooves, and a single cylindrical passageway is also contemplated. It is not necessary that these grooves be formed in the sleeve 11, since they can with equal facility be produced in the body 10. The resistor 28 has been described as a tungsten resistor, but it may be made of tantalum, carbon or other materials as well. A wide variety of nozzles may also be employed to spray the fuel without departing from the present invention. In this regard, it is essential that the fuel be projected annularly about a resistor element so as not to contact the same.

What is claimed is:

1. In a monofuel reactor comprising a reactor body having a reaction chamber, means for supplying a monofuel to the reactor and means providing for egress of gases from the reaction chamber, the improvement which comprises means for injecting an annular spray of monofuel into the reaction chamber, a thin metal sleeve lining the reaction chamber, a regenerative cooling system interposed between the sleeve and the reactor body and connected at one end to the monofuel supply means and at the other end to the monofuel injection means, an initiator element extending axially of the annular spray of monofuel, and means for heating the initiator element to initiate autodecomposition of the monofuel.

2. In a monofuel reactor comprising a reactor body having a reaction chamber, means for supplying a monofuel to the reactor and means providing for egress of gases from the reaction chamber, the improvement which comprises means for injecting an annular spray of monofuel into the reaction chamber, a thin metal sleeve lining the reaction chamber approximately concentrically of the monofuel spray and in contiguous relationship with the reactor body, a regenerative cooling system interposed between the sleeve and the reactor body and connected at one end to the monofuel supply means and at the other end to the monofuel injection means, a resistor element extending axially of the annular spray of monofuel, and means for electrically heating the resistor element to initiate autodecomposition of the monofuel.

3. In a monofuel reactor comprising a reactor body having a reaction chamber, means for supplying a monofuel to the reactor and means providing for egress of gases from the reaction chamber, the improvement which comprises means for injecting an annular spray of monofuel into the reaction chamber, a thin metal sleeve lining the reaction chamber approximately concentrically of the monofuel spray and in contiguous relationship with the reactor body, a plurality of passageways provided between the reactor body and the sleeve, means connecting said passageways at one end with the monofuel supply means and at the other end with the monofuel injection means to thus regeneratively cool said sleeve, a resistor element extending axially of the annular spray of monofuel, and means for electrically heating the resistor element to initiate autodecomposition of the monofuel.

4. In a monofuel reactor comprising a lightweight reactor body having a reaction chamber, means for supplying the monofuel to the reactor and means providing for egress of gases from the reaction chamber, the improvement comprising an elongated heating element positioned in the reaction chamber, means for electrically heating said heating element, means for injecting an annular spray of fuel concentrically about the heating element, a thin metal sleeve lining the reaction chamber, and a plurality of spiral passageways interposed between the sleeve and the reactor body and connected at one end to the monofuel supply means and at the other end to the monofuel injection means for regeneratively cooling the sleeve.

5. In a monofuel reactor comprising a reactor body having a reaction chamber, means for supplying the monofuel to the reactor and means providing for egress of gases from the reaction chamber, the improvement which comprises means for injecting an annular spray of monofuel into the reaction chamber, a resistor extending axially of the annular spray of monofuel, and means for electrically heating the resistor element to initiate autodecomposition of the monofuel.

6. In a monofuel reactor comprising a hollow, cylindrical reactor body whose interior defines a reaction chamber, a head block closing one end of said reaction chamber, a core having exhaust ports therein positioned at the other end of the reaction chamber, means located on the core for projecting an annular spray of monofuel into the reaction chamber, a thin metal sleeve lining the reaction chamber from the head block to the core and extending longitudinally in concentric relationship to the annular spray of monofuel, a regenerative cooling system interposed between the sleeve and the reaction body and connected at one end to the monofuel supply means and at the other end to the monofuel projection means, a resistor element extending axially of the annular spray of monofuel, and means for electrically heating the resistor element to initiate autodecomposition of the monofuel.

7. In a monofuel reactor comprising a hollow, cylindrical reactor body whose interior defines a reaction chamber, a head block closing one end of said reaction chamber, a core having exhaust ports therein positioned at the other end of the reaction chamber, means for supplying fuel to the reactor through the head block, means located upon the core for injecting an annular spray of monofuel into the reaction chamber and spaced toward the head block from the exhaust ports in the core, a resistor element extending axially of the annular spray of monofuel, and means for electrically heating the resistor element to initiate autodecomposition of the monofuel.

8. In a monofuel reactor comprising a reactor having a reaction chamber therein, fuel supply means and exhaust means for providing egress of gases from the reaction chamber, the improvement which comprises an elongated heating element positioned in the reaction chamber, means for electrically heating said heating element, means for injecting an annular spray of fuel concentrically about the heating element and in a direction away from the exhaust means, and means for regeneratively cooling the walls of the reaction chamber with monofuel, said regenerative cooling means being connected at one end to the fuel supply means and at the other end to the fuel injecting means.

9. In a monofuel reactor comprising a reactor body having a reaction chamber therein, fuel supply means and exhaust means for providing egress of gases from the reaction chamber, the improvement which comprises an elongated heating element positioned in the reaction chamber, means for electrically heating said heating element, means for injecting an annular spray of fuel concentrically about the heating element and in a direction away from the exhaust means, means for regeneratively cooling the walls of the reaction chamber with monofuel, said regenerative cooling means being connected at one end to the fuel supply means and at the other end to the fuel injecting means, and subsequently injecting this regeneratively heated monofuel into the reaction chamber.

10. A monofuel reactor comprising a reactor body having a reaction chamber; means for supplying monofuel to said chamber; means for providing egress of gases from said chamber; means for cooling the walls of said reaction chamber during autodecomposition of said monofuel; means for injecting an annular spray of monofuel into said chamber; an initiator element extending axially of the annular spray of monofuel; and means for heating said initiator element to initiate autodecomposition of monofuel.

References Cited in the file of this patent

UNITED STATES PATENTS 2,500,334    Zucrow  ---------------- Mar. 14, 1950